(12) United States Patent
Carlson et al.

(10) Patent No.: US 6,191,901 B1
(45) Date of Patent: *Feb. 20, 2001

(54) DISK DRIVE WHICH DETECTS HEAD FLYING HEIGHT USING FIRST AND SECOND DATA PATTERNS WITH DIFFERENT FREQUENCIES

(75) Inventors: Lance R. Carlson, Longmont; Jeffrey L. Whaley, Boulder; Robert L. Metz, Westminster, all of CO (US)

(73) Assignee: Maxtor Corporation, Longmont, CO (US)

( * ) Notice: Under 35 U.S.C. 154(b), the term of this patent shall be extended for 0 days.

This patent is subject to a terminal disclaimer.

(21) Appl. No.: 09/439,702

(22) Filed: Nov. 15, 1999

Related U.S. Application Data

(62) Division of application No. 09/224,202, filed on Dec. 30, 1998, which is a continuation of application No. 08/764,340, filed on Dec. 12, 1996, now Pat. No. 5,909,330.

(51) Int. Cl.$^7$ ................................................. G11B 27/36
(52) U.S. Cl. ..................................... 360/31; 48/75; 48/60
(58) Field of Search ............................. 360/60, 31, 75, 360/67, 77.08, 103, 48, 71

(56) References Cited

U.S. PATENT DOCUMENTS

| | | | |
|---|---|---|---|
| 4,146,911 | * 3/1979 | Gyi et al. | 360/75 |
| 4,777,544 | 10/1988 | Brown et al. | 360/75 |
| 4,841,389 | * 6/1989 | Hoyt et al. | 360/75 |
| 5,082,827 | 1/1992 | Barnes | 505/1 |
| 5,130,866 | 7/1992 | Klaassen et al. | 360/75 |
| 5,168,413 | 12/1992 | Coker et al. | 360/137 |
| 5,377,058 | 12/1994 | Good et al. | 360/75 |
| 5,410,439 | 4/1995 | Egbert et al. | 360/75 |
| 5,412,519 | 5/1995 | Buettner et al. | 360/73.03 |
| 5,831,781 | * 11/1998 | Okamura | 360/67 X |
| 6,088,176 | * 7/2000 | Smith et al. | 360/46 |

* cited by examiner

*Primary Examiner*—Andrew L. Sniezek
(74) *Attorney, Agent, or Firm*—David M. Sigmond

(57) ABSTRACT

The present invention relates to a system for determining whether the flying height of a read/write head above a disk in a disk drive is within an acceptable range, in substantially real time. The system relies on variations in read signal resolution with flying height to make the determination. In one embodiment, read signal resolution is measured and compared to a predetermined threshold value to determine whether the present flying height is in the desired range. In another embodiment, the number of peaks in a read signal that are detected (and/or not detected) by a detector is used to determine whether the head is in the proper flying height range. Because of read signal resolution effects, the number of detected peaks will decrease as the flying height of the head is increased. The system also provides for postponing a transfer of data to/from the disk when it is determined that the head is not within the acceptable range.

30 Claims, 9 Drawing Sheets

DISK DRIVE WHICH DETECTS HEAD FLYING HEIGHT USING FIRST AND SECOND DATA PATTERNS WITH DIFFERENT FREQUENCIES

CROSS-REFERENCE TO RELATED APPLICATIONS

This application is a divisional of U.S. application Ser. No. 09/224,202, filed Dec. 30, 1998, which is a continuation of U.S. application Ser. No. 08/764,340, filed Dec. 12, 1996 (U.S. Pat. No. 5,909,330).

FIELD OF THE INVENTION

The invention relates in general to digital data storage devices and, more particularly, to digital data storage devices that utilize a head to transfer data from/to a moving medium.

BACKGROUND OF THE INVENTION

A disk drive is a digital data storage device that stores data in substantially concentric tracks on the surface of a disk. During the operation of a disk drive, the disk is rotated at a substantially constant rate while data is written to or read from its surface. The disk drive is generally coupled to a host computer that delivers access requests to the disk drive whenever the host desires to store or retrieve digital information. To perform an access request, the disk drive first positions a head above the track of the rotating disk specified in the access request. Once the head is properly positioned, the requested data transfer (i.e., either a read operation or a write operation) is allowed to take place. During a read operation; data from the predetermined track is sensed by the head, after which it is processed by a read channel and delivered to the host system. During a write operation, data is received from the host, processed into a suitable format, and then delivered to the head which transfers the data to the predetermined track.

During operation of the disk drive, the head generally rides above the disk surface on a cushion of air (known as an air bearing) that is created by the movement of the disk under the head. The distance of the head from the disk while riding on the air bearing is referred to as the "flying height" of the head. To produce the "lift" required to hold up the head, head "sliders" are generally used that have the requisite aerodynamic qualities. In general, the performance of the disk drive will depend, to a great extent, on the maintenance of a proper head flying height. That is, performance will be degraded if the actual flying height of the head is considerably higher, for example, than a nominal flying height. This is particularly the case during write operations where an unexpected increase in flying height can result in written data that is unreadable.

A need therefore exists for a method and apparatus for determining whether the actual flying height of a head is within a desired range.

SUMMARY OF THE INVENTION

The present invention relates to a system for determining whether the actual flying height of a head is within a desired range. The system is capable of operating "on the fly" and may therefore be implemented in a disk drive system without substantially increasing disk access times. That is, the flying height determination can be made substantially in real time, before the head reaches the data sector to be written to or read from. This allows the drive to forego the transfer of data between the head and the disk when it is found that the head is outside of the desired flying height range, which is generally determined by empirical methods. The present invention has application in virtually any type of data recording system using either a contact, a pseudo contact, or a non-contact head to transfer data from/to a moving medium. This can include, for example, magnetic disk drive systems, magnetic tape systems, and optical disk drive systems. In one application, the invention is used in a system utilizing low flying height heads, such as the Tripad (TM) head manufactured by Read-Rite.

To operate in real time, the invention relies on the relationship between read signal resolution and flying height. Read signal resolution is a performance measurement that is related to the disk drive's ability to read information at different frequencies. In this regard, read signal resolution is generally calculated using the ratio of the magnitudes of two analog read signal portions having different frequencies. In conceiving of the present invention, it was appreciated that the ability of a read head to read data patterns at higher frequencies diminishes at a faster rate than the ability of the head to read lower frequency patterns as the head moves away from the disk. Because of this, read signal resolution changes in a predictable manner as the flying height of the head increases. In general, the invention determines a read signal resolution value, or a read signal resolution related value, and then compares the value to a predetermined value to determine whether the flying height is in the proper range.

In one aspect of the present invention, a disk drive is provided that comprises a disk having a first data pattern with a first frequency and a second data pattern with a second, higher frequency on a first track. The disk drive also includes means for reading the first and second data patterns, using a head at a first vertical distance from the disk, to create first and second analog signal portions, respectively. In addition, the disk drive includes a determination unit for determining whether the first vertical distance of the head is within an acceptable range for performing a transfer of user data between the first track and an exterior environment using the first analog signal portion and the second analog signal portion, wherein the determination unit does not require the movement of the head to a substantially different vertical distance to make the determination.

The determination unit determines whether the first vertical distance is within the desired range based on read signal resolution. The read signal resolution can be calculated by taking the ratio of the magnitudes of the first and second analog signal portions. The determination unit can include a comparison unit for comparing the calculated read signal resolution to a threshold resolution value that represents the maximum flying height that will result in an acceptable read or write performance. The resolution value can be stored in a memory along with other resolution values for different areas of the disk surface. For example, one stored threshold value can correspond to each zone on the disk.

The first and second data patterns can be stored anywhere within the first track. In one embodiment, the patterns are stored in a servo data region of the first track. To decrease overhead on the disk, the patterns can be stored in standard servo fields, such as the automatic gain control (AGC) field and/or the C/D servo burst fields. Alternatively, a dedicated servo field can be created for one or both of the patterns.

The disk drive can also include a unit for postponing the transfer of user data to the first track when it is determined that the head is not within the proper vertical distance range.

For example, the first data pattern and the second data pattern can both be located in a servo sector immediately preceding a data area on the first track. The patterns can be read by the reading device and then the determination unit can determine whether the head is in the proper range. If the head is not in the proper range, the postponement unit can decide not to read or write data from/to the data area as the head proceeds to pass over the data area from the servo sector. The postponement unit can then perform a retry on the next revolution of the disk.

In one embodiment, the determination unit includes a transition detector for detecting indicia (such as, for example, peaks) in the second analog signal portion that are indicative of magnetic transitions stored on the surface of the disk. Because of the read signal resolution effect, when a relatively high frequency pattern is read by the head at an elevated flying height, some of the resulting indicia will not be detectable by the transition detector. Therefore, the number of indicia detected (and/or not detected) by the transition detector can be used as an indicator of flying height. The transition detector can include, for example, an analog peak detector, a PRML channel, a decision feedback equalizer, a finite delay tree search unit, or any other means for detecting indicia in a read signal.

In another aspect of the present invention, a disk drive is provided that includes a unit for determining whether the head is currently within an acceptable vertical distance from the disk surface for performing a transfer of user data between the predetermined track and the exterior environment before a transfer of user data is allowed to occur, wherein the determination does not include means for changing a current vertical distance between the head and the disk surface, and a transfer unit for performing the transfer of user data only when the head is determined to be within the acceptable vertical distance by the determination unit.

The determination unit operates in substantially real time so that the required determination can be made before the transducer reaches the data area to/from which data is to be transferred. The determination unit can make the required determination based upon read signal resolution or any other method capable of real time operation. In addition, the determination unit can include a comparison unit or peak detection unit as described above.

In yet another aspect of the present invention, a disk drive is provided comprising: a disk having a plurality of concentric tracks, the disk including a first pattern having a first frequency and a second pattern having a second frequency, the second frequency being greater than the first frequency; a head for use in transferring data to/from the disk; means for reading the first pattern using the head to create a first analog waveform having a first magnitude value; means for reading the second pattern using the head to create a second analog waveform having a second magnitude value; a combining unit for combining the first magnitude value and the second magnitude value to create a read signal resolution related value; and a comparison unit for comparing the read signal resolution related value to a threshold value.

In one embodiment, the threshold value is based on a minimum read signal resolution that will produce an acceptable data transfer performance in the disk drive. The combining unit can include a means for finding a ratio between the first magnitude and the second magnitude. The comparison unit can include a storage unit for storing a plurality of threshold values corresponding to different areas on the disk surface and a retrieval unit for retrieving one of the threshold values corresponding to a track currently being accessed.

In still another aspect of the present invention, a disk drive is provided comprising: a disk having a plurality of concentric tracks, the disk including a first track having a first data pattern with a first frequency; a head for use in transferring data to/from the disk; means for reading the first data pattern, using the head, to produce an analog read signal having a predetermined number of peaks representative of data on the disk surface; a processing unit for processing the analog read signal to determine which of the peaks in the analog read signal meet a predetermined detection criterion, wherein less than all of the predetermined number of peaks will meet the predetermined detection criterion when the head is not within the desired flying height range due to relatively low read signal resolution at the first frequency, the processing unit creating an output signal; and a determination unit for determining whether the flying height of the head is within the desired range based on the output signal of the processing unit.

In one embodiment, the processing unit determines how many of the peaks in the analog read signal meet the predetermined detection criterion and then compares the resulting peak count value to a threshold count value. As described above, the comparison unit may include a data storage unit for storing at least one, and preferably a plurality, of threshold count values. In addition, the determination unit can include a comparison unit for comparing the peak count value to a table of predetermined count values each having an associated flying height value to determine an actual present flying height value. The first data pattern can include, for example, a constant frequency data pattern or a variable frequency data pattern, such as a chirp or random pattern, that includes the first frequency. In addition, the processing unit may include a transition detector as described above.

In a further aspect of the present invention, a disk drive is provided that includes a read channel including a determination unit for determining whether a head is within an acceptable vertical distance from a disk surface for performing a transfer of user data between a track of the disk and an exterior environment. In one embodiment, the channel, including the determination unit, is implemented on a single semiconductor chip. In another embodiment, the channel includes an optimization unit for optimizing the channel for performing the determination function by changing the value of at least one of the channel parameters during a period when the determination unit is performing the determination function.

DETAILED DESCRIPTION

The present invention relates to a system for detecting head flying height variations in a disk drive in real time. That is, the system allows head flying height to be checked on the fly while a corresponding read or write operation is being performed. In this way, read and/or write operations can be postponed whenever it is determined that the current flying height of the head is outside a normal flying height range. Although the system may be used in virtually any type of data recording system that uses a head to read/write information to a recording medium, the system is of particular value in systems that use low flying height head elements, where even small variations in flying height can degrade performance significantly. As used herein, the term low flying height head encompasses both contact heads and pseudo-contact heads.

Figure 1:
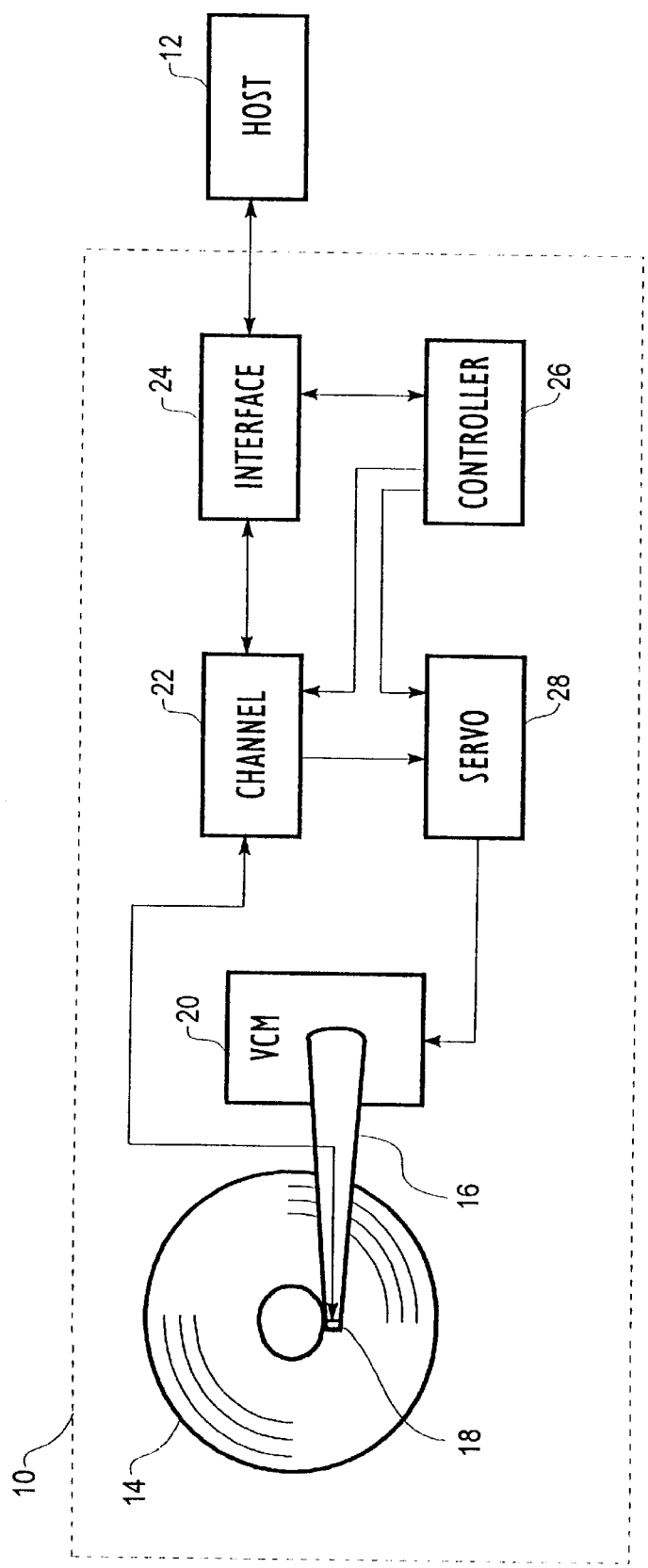
FIG. 1 is a block diagram illustrating a disk drive system that can utilize features of the present invention.

FIG. 1 is a block diagram of a disk drive system 10 which can utilize features of the present invention. As illustrated, the disk drive system 10 is coupled to an external host unit 12 for performing disk storage and retrieval operations under the control of the host 12. The disk drive 10 includes: a disk 14, a spin motor (not shown) for rotating the disk 14, an actuator arm assembly 16, a head 18, a voice coil motor 20, a channel 22, an interface 24, a disk controller unit 26, and a servo control unit 28. The controller 26 is operative for controlling the operation and timing of the other elements in the disk drive system 10. The interface 24 is operative for managing the flow of data to/from the host unit 12 and receiving commands from the host unit 12 for delivery to the controller 26. The channel 22 is operative for processing data flowing between the host 12 and the disk 14. For example, during a read operation, the channel 22 receives an analog read signal from the head 18 and converts this to a digital signal which is recognizable by the host 12. During a write operation, the channel processes a digital signal from the host 12 and converts it to a variable write current signal which is delivered to the head 18 for storage on the disk 14. The actuator arm 16 carries the head 18 at a distal end for positioning the head 18 above the disk 14. The voice coil motor 20 is operative for imparting motion to the actuator arm 16 during read and write operations to position the head 18 above a desired track on the surface of disk 14. The voice coil motor 20 is responsive to a servo control signal from servo control unit 28 that controllably positions the actuator arm 16 based on the location of the track requested by the host 12 in a recent access request.

In a preferred embodiment of the present invention, the head 18 is a low flying height head. The general trend in disk drives today is to design heads that ride closer to the disk surface than heads have in the past, i.e., low flying height heads. By riding closer to the disk surface, low flying height heads produce less spacing loss and are able to read/write data on the disk with greater definition, thereby allowing more data to be stored in a given area on the disk surface. Low flying height heads, however, are generally more sensitive to variations in head flying height than are heads of the past. That is, in general, the performance of a low flying height head that normally flies at 2 microinches will be degraded to a much larger extent if the flying height of the head is temporarily increased by 2 microinches than would the performance of a head that normally flies at 5 microinches.

To exacerbate the problem, low flying height heads are more likely to experience variations in flying height than are higher flying height heads. For example, low flying height heads are more likely to pick up particles from the disk surface that increase the flying height of the head than are heads that fly at higher heights. That is, debris or lubrication material on the disk surface may attach to the underside of the head, resulting in a greater flying height due to increased lift from the debris/material or contact between the debris/ material and the disk surface. The undesirable debris/ material usually stays on the head for a short period of time causing a temporary flying height increase.

Figure 2:
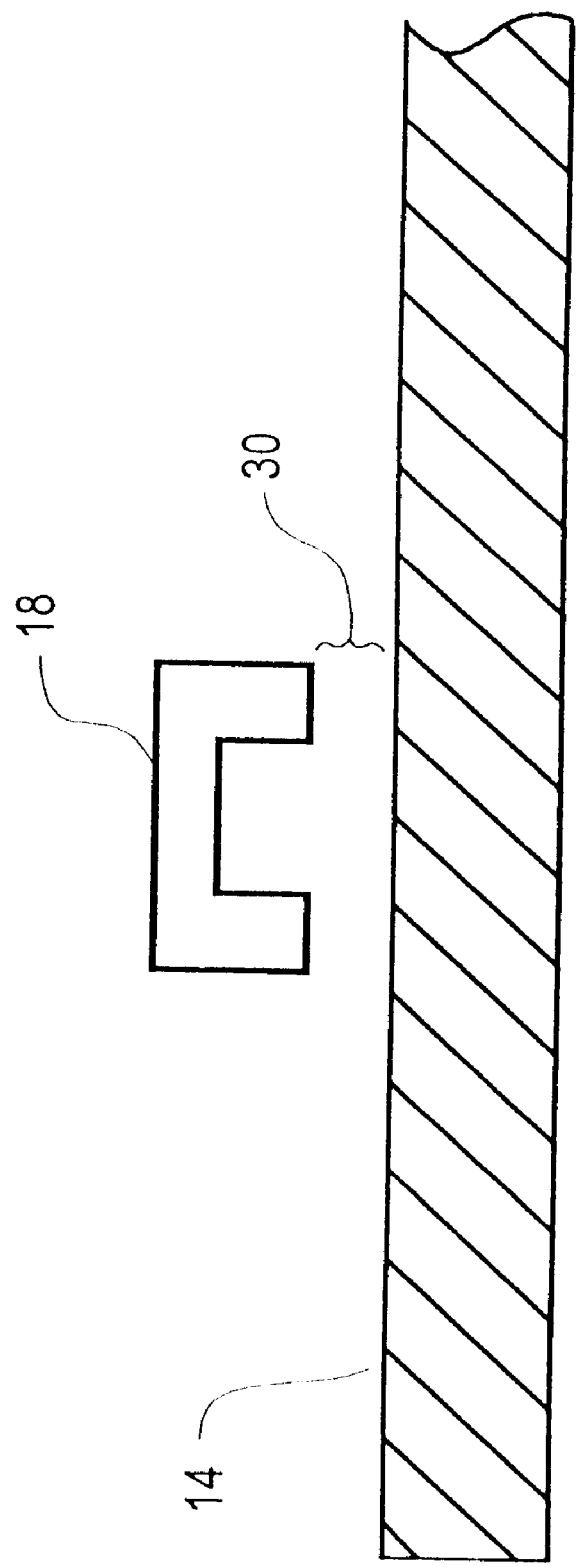
FIG. 2 is a sectional view of a disk and an associated head (having a head slider) illustrating the flying height of the head above the disk surface.

As described above, the invention is capable of detecting variations in head flying height in substantially real time. FIG. 2 is a sectional view illustrating what is meant by the term "flying height." As illustrated in the figure, during operation, the head 18 (which, as illustrated, includes a slider) is raised above the surface of the disk 14 by a spacing 30 known as the flying height of the head 18. The spacing 30 is created by the interaction between air currents above the disk 14, caused by rotation of the disk 14, and the aerodynamic qualities of the head slider. The slider is generally designed to keep the head within a certain predetermined flying height range during operation of the disk drive. When the head 18 is outside of this flying height range, the performance of the disk drive 10 can be seriously compromised. For example, if the head 18 is too high above the surface of the disk 14 (i.e., the flying height is too large), the magnetic fields produced by the head 18 will not be strong enough at the disk surface 14 to properly store the required magnetic transitions. This results in a recorded signal on the surface of the disk 14 that is weak and potentially unreadable by the head 18 during a subsequent read operation. Similarly, if the head 18 is too far above the surface of the disk 14, the head 18 may not be able to read previously written data on the surface of the disk 14.

To detect flying height variations in real time, the present invention relies upon variations in read signal resolution with flying height. Read signal resolution is a performance measurement that is related to the disk drive's ability to read information at different frequencies. In this regard, read signal resolution is generally calculated using the ratio of the magnitudes of two analog read signal portions having different frequencies. For example, to measure read signal resolution, a burst having a first frequency can be read from the disk surface to create a first analog signal portion and then a burst having a second, higher frequency can be read from the disk surface to create a second analog signal portion. The read signal resolution can then be calculated based upon the ratio of the magnitude of the second signal portion to the magnitude of the first signal portion. To maintain an accurate resolution measurement, both bursts have to be read at substantially the same head flying height. In conceiving the present invention, it was discovered that read signal resolution varies with head flying height in an inverse manner. That is, as the flying height of the head increases, the read signal resolution for the head decreases. This is because head performance at elevated frequency levels degrades more rapidly with increased flying height than does head performance at lower frequency levels.

Figure 3:
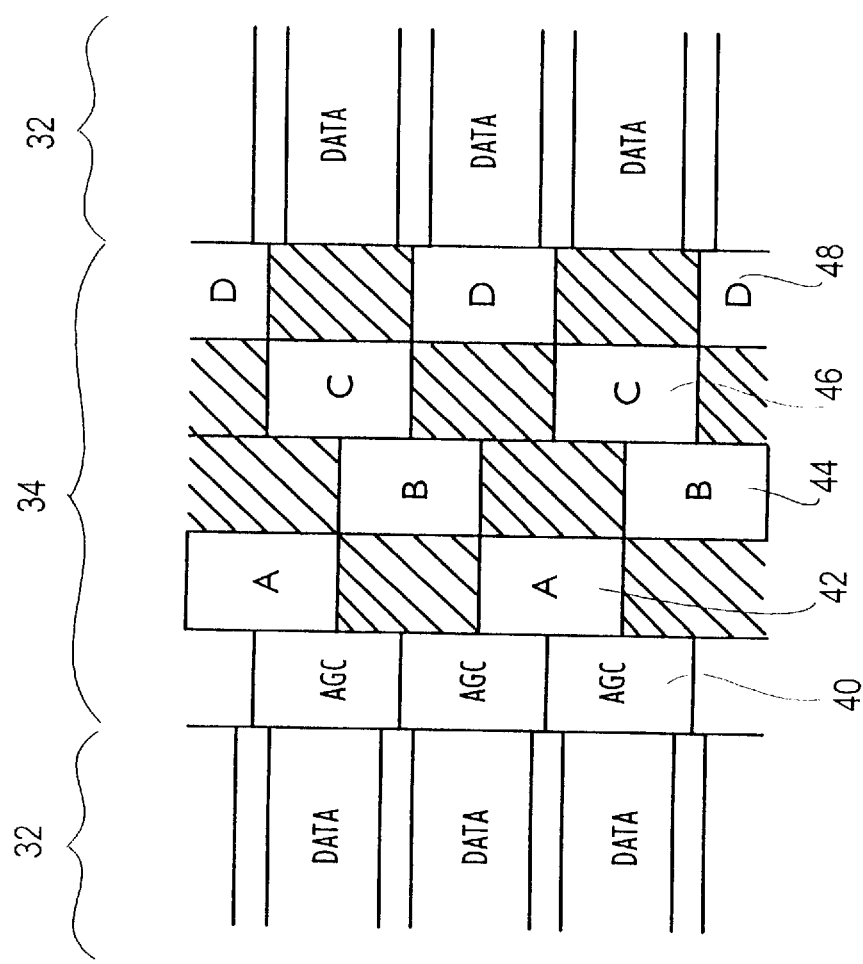
FIG. 3 is a diagram illustrating data storage patterns on a disk surface in accordance with one embodiment of the present invention.

FIG. 3 is a diagram illustrating the informational content of a portion of a disk surface in accordance with one embodiment of the present invention. As illustrated, the surface portion includes a plurality of data regions 32 that are periodically interrupted by servo positioning information portions 34. It should be appreciated that although the present embodiment of the invention is implemented in a system using an embedded servo scheme, the invention can also be implemented in systems using dedicated or hybrid servo schemes. The plurality of data regions 32 are arranged in concentric tracks on the disk surface. Each servo positioning information portion 34 includes, among other things, at least one automatic gain control (AGC) field 40 centered on a corresponding track and a plurality of servo positioning bursts (i.e., an A burst 42, a B burst 44, a C burst 46, and a D burst 48) for use by servo unit 28 in positioning the head 18 above the track. It should be appreciated that other servo information may also be present in each servo positioning portion 34 of FIG. 3 in accordance with the present invention. However, for purposes of convenience and clarity, the illustrated servo positioning portion 34 has been limited to the elements shown.

The AGC field 40 is used by the disk drive 10 to, among other things, set the gain of the channel 22 during read operations. That is, the head 18 reads the AGC field 40 and uses the magnitude of the resulting analog read signal to determine the optimal gain of the channel 22. As described above, the servo bursts 42–48 are used by the disk drive system 10 for, among other things, positioning the head 18 above the disk 14. The A/B bursts 42, 44 are used primarily during track following operations (i.e., maintaining the head 18 over the corresponding track) and the C/D bursts 46, 48 are used primarily during seek and settling operations (i.e., moving the head 18 from one track to another). In general, the A, B, C, and D bursts 42–48 are each comprised of a plurality of successive, equally spaced magnetic transitions on the surface of the disk. As these transitions are read by the head, a substantially periodic analog read signal is created. The frequency of the resulting read signal is related to how closely the transitions are packed in the corresponding burst, i.e., how many transitions occur in a given angular portion of the disk. As used herein, the "frequency" of a burst refers to the frequency of the analog read signal that results from the sensing of the burst by the head 18.

Figure 4:
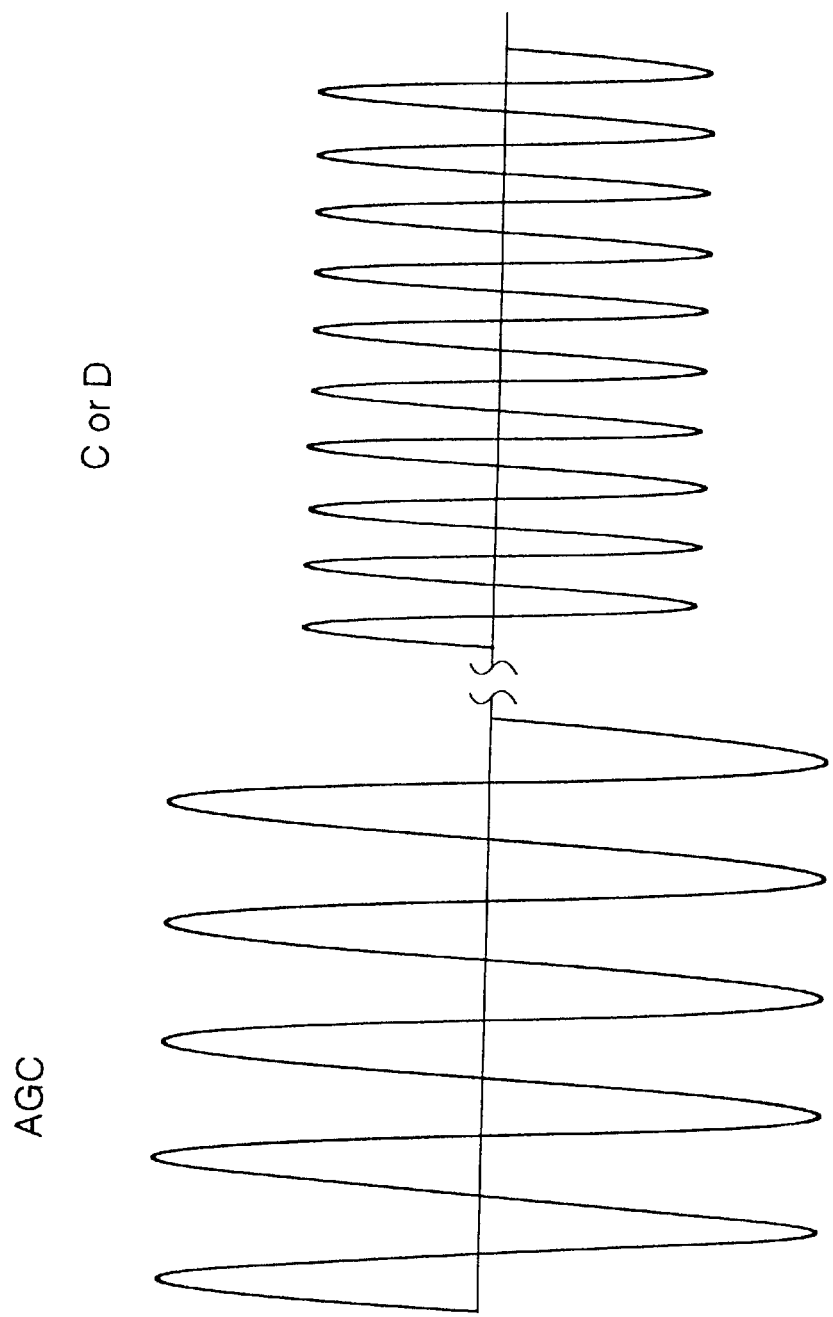
FIG. 4 is a waveform illustrating portions of an analog read signal in accordance with one embodiment of the present invention.

In past systems, the frequency of the AGC field 40 was the same as the frequency of all of the other bursts 42–48. In accordance with one embodiment of the present invention, the C burst 46 and the D burst 48 are recorded on the surface of the disk 14 at a frequency that is higher than the frequency of the AGC field 40 and both the A burst 42 and the B burst 44. Therefore, when the head 18 is centered on one of the tracks, it is possible to find a magnitude of the analog read signal for both the AGC burst 40 and either the C burst 46 or the D burst 48, depending upon which one is centered for the particular track. FIG. 4 illustrates portions of an analog read signal resulting from the reading of an AGC field 40 and a C or D burst 46, 48. As illustrated, the C/D portion of the signal is at a higher frequency than the AGC portion of the signal. Consequently, the magnitude of the AGC portion is greater than the magnitude of the C/D portion. The ratio between the frequency of the AGC field 40 and the frequency of the C/D burst 46, 48 is chosen to provide a measurable change in resolution for flying height changes of interest at all disk locations. In addition, the frequency of the C/D burst can be different at different track locations (i.e., zoned) to optimize the measurable resolution change.

Figure 5:
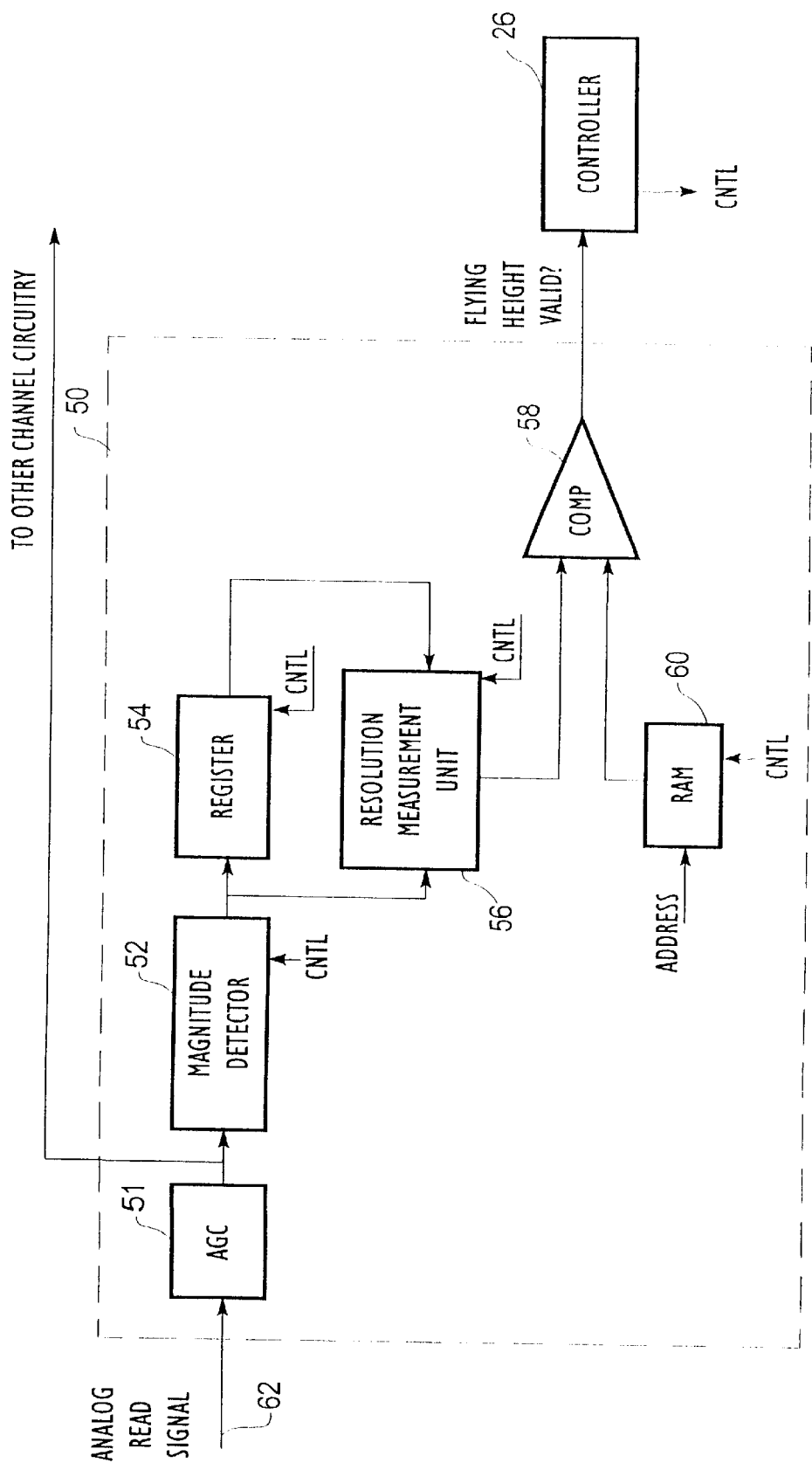
FIG. 5 is a block diagram illustrating a flying height determination apparatus in accordance with one embodiment of the present invention.

FIG. 5 is a block diagram illustrating an apparatus 50, in accordance with the present invention, for determining whether the head 18 is within a proper flying height range using the analog signal portions of FIG. 4. In one embodiment of the present invention, the apparatus 50 is located within the channel 22 of the system 10. For example, the apparatus 50 can be implemented on the same semiconductor chip as the channel 22. Alternatively, the bulk of the operations performed by apparatus 50 can be implemented in firmware in the controller 26.

The apparatus 50 includes: AGC circuitry 51, a magnitude detector 52, a register 54, a resolution measurement unit (RMU) 56, a comparator 58, and a random access memory (RAM) 60. As illustrated in FIG. 5, the apparatus 50 receives the analog read signal from the head 18 at an input 62. The AGC circuitry 51 receives the analog read signal from input 62 and normalizes the magnitude of other portions of the read signal to the magnitude of the AGC portion of the signal. The AGC circuitry 51 then delivers the processed read signal to the magnitude detector 52 and to other circuitry in the channel. Under the control of the controller 26, the magnitude detector 52 first measures the magnitude of the AGC portion of the analog signal. The magnitude of the AGC portion is then delivered to the register 54, under the control of the controller 26, where it is stored for later use. The magnitude detector 52 then measures the magnitude of the C/D portion of the analog read signal. The magnitude of the C/D portion and the stored magnitude of the AGC portion are next delivered to the RNU 56 for calculation of the read signal resolution. The resulting read signal resolution value is then compared, in comparator 58, to a threshold resolution value, stored in RAM 60, corresponding to the portion of the disk 14 being accessed. The threshold values stored in the RAM 60 represent the read signal resolutions at the maximum head flying heights that will result in an acceptable performance of the disk drive system 10. Each value stored in the RAM 60 corresponds to a different area on the disk surface (such as, for example, a different zone, track, or sector.) The output of the comparator 58, therefore, is indicative of whether the present flying height of the head 18 is adequate for the performance of a read and/or write operation.

This flying height indication is delivered to the controller 26 which makes a decision as to whether the corresponding read/write operation should be postponed. If a decision is made to postpone the operation, the controller 26 will ignore the subsequent data area 36 (that is, the data area 36 following the present servo portion 34) and attempt to "retry" the read/write operation when the disk rotates to a point where the servo portion 34 and the data area 36 once again pass under the head 18. If, after repeated passes, the head 18 does not fall within the prescribed flying height range, the controller 26 will determine that an error condition exists and can indicate such to the host. Alternatively, the controller 26 can initiate remedial action designed to overcome a presumed cause of the defective flying height. For example, the controller 26 can initiate a routine designed to remove any foreign matter from the air bearing surface of the head 18. Also, the controller 26 can perform a write operation ignoring detection of the high flying condition and then perform a read operation on the same data to determine whether it was properly written. Furthermore, for write operations, the data can be moved to a new location and the defective location can be marked bad.

In one embodiment of the present invention, the need for additional circuitry can be reduced or eliminated through efficient use of the AGC circuitry 51 of the channel 22. As described above, the function of the AGC circuitry 51 is, in general, to normalize the magnitude of other portions of the read signal to the magnitude of the AGC portion of the signal. Therefore, the AGC circuitry 51 normalizes the C/D portion of the signal to the magnitude of the AGC portion, by amplification. The magnitude of the normalized C/D burst can then be measured and compared directly to a predetermined threshold value in RAM for that track (or portion of the disk). This reduces circuit complexity and cost since it is not necessary to measure the amplitude of the AGC portion 40. Therefore, by efficient use of the AGC circuitry 51, the present embodiment can be implemented with little or no additional circuitry and some additional firmware.

Because the present approach only requires a change in the frequency of the C and D bursts, on-track servo following is not affected. That is, the A and B bursts are used in the same manner that they are used in prior art servo systems. The C and D bursts, which are normally used during seeking and settling functions, are also used in substantially the same manner that they were used in the prior art. That is, even though an elevated frequency is being used for the C and D bursts, the relative magnitudes of the corresponding read signal portions should be substantially the same.

Figure 6:
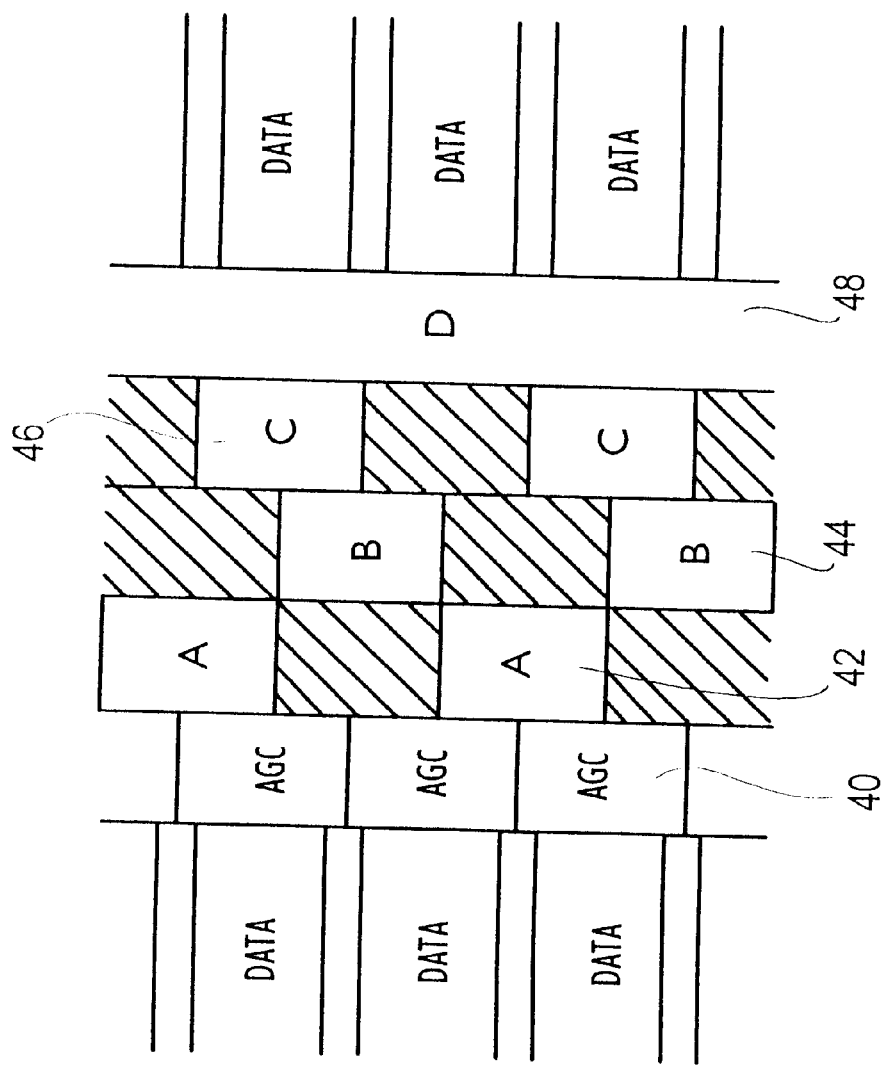
FIG. 6 is a diagram illustrating data storage patterns on a disk surface in accordance with another embodiment of the present invention.

In another embodiment of the present invention, as illustrated in FIG. 6, a dedicated D burst 48 is used that is continuous across the disk surface. That is, the D burst extends across all of the tracks and is exclusively used to determine the read signal resolution of the head 18. This technique allows a head flying height determination to be made while the head 18 is either on or off the track. As in the prior embodiment, the present embodiment does not affect track following operations, but could affect seeking and settling operations due to the fact that only a single quad (i.e., C or D) burst is available.

Figure 7:
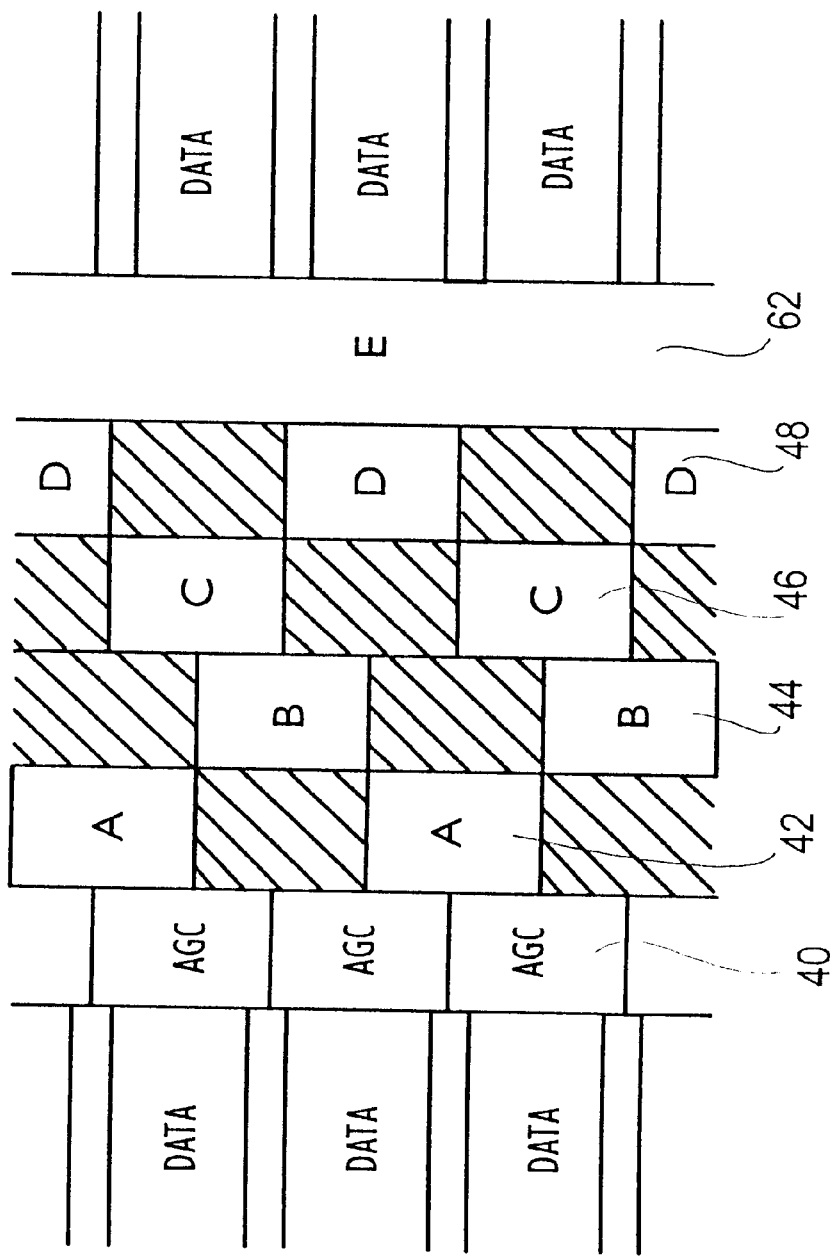
FIG. 7 is a diagram illustrating data storage patterns on a disk surface in accordance with yet another embodiment of the present invention.

FIG. 7 illustrates a servo pattern in accordance with yet another embodiment of the present invention. As illustrated, the servo pattern includes an E burst 62 extending across the surface of the disk. Only the E burst 62 will have a frequency that is greater than the other bursts. That is, the AGC field 40 and the A, B, C, and D bursts 42–48 will all have the same frequency, while the E burst 62 will have an elevated frequency. Read signal resolution will be measured in substantially the same manner as described previously, except that the higher frequency signal portion will result from the E burst 62. Because this embodiment does not change any of the A to D bursts 42–48, track following, seeking, and settling operations are substantially unaffected. However, the addition of servo burst E 62 adds overhead to the system and requires a change in the current ASIC chip controlling the servo field strobes.

Figure 8:
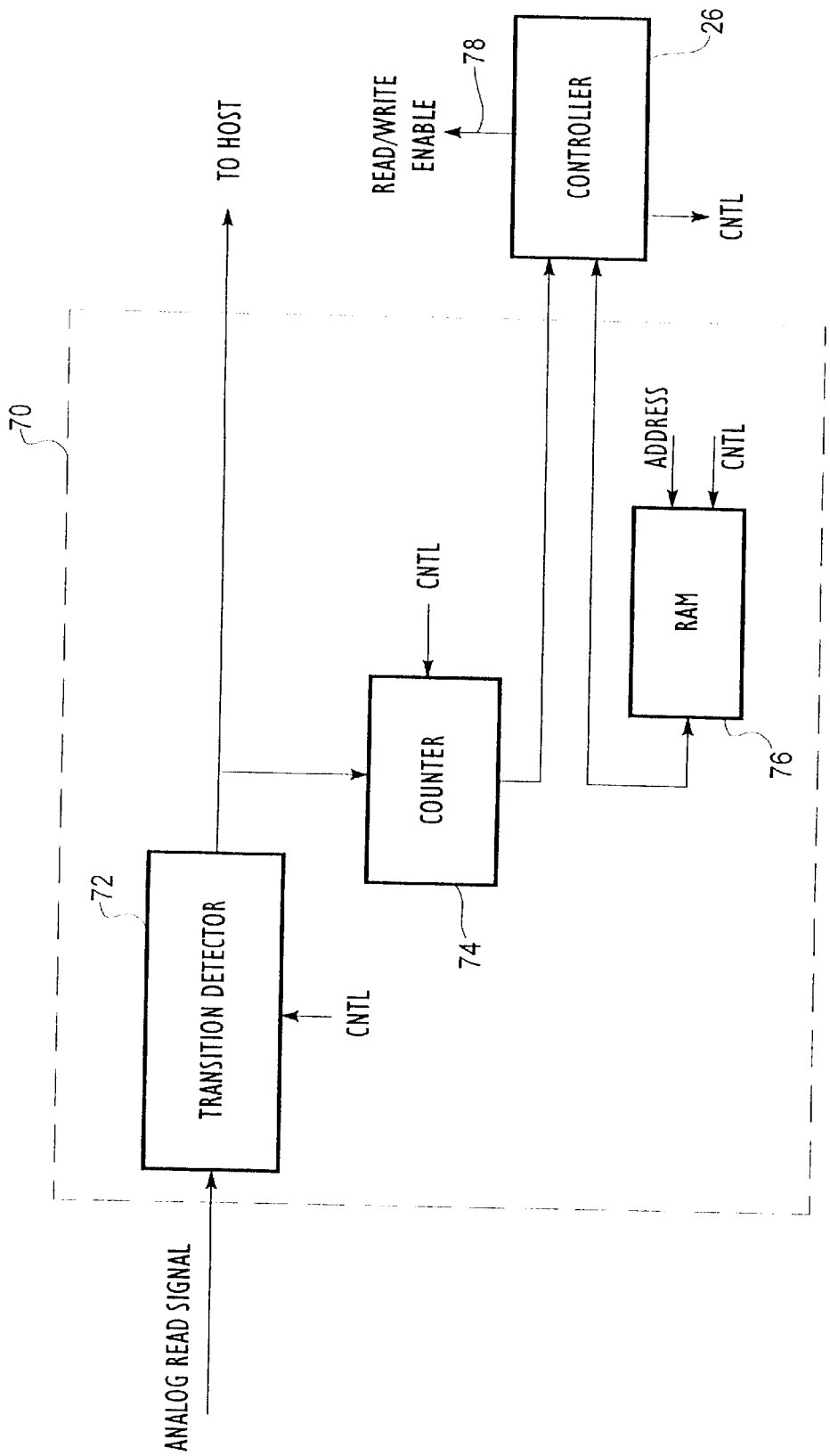
FIG. 8 is a diagram illustrating a flying height determination apparatus in accordance with another embodiment of the present invention.

FIG. 8 illustrates an apparatus 70 in accordance with another embodiment of the present invention. The apparatus 70 is capable of detecting whether the head 18 is within an acceptable flying height range based upon the number of peaks (or other indicia) in an analog read signal that are detected (or not detected) by a transition detector. As the flying height of the head increases, the read signal resolution decreases causing a decrease in read signal amplitude at higher frequencies. Therefore, when a pattern having an elevated frequency is read by the head at a relatively high flying height, the reduced read signal resolution can result in an analog read signal that has a number of peaks (or other indicia) that are undetectable by a transition detector. The number of peaks that are detectable, therefore, can be used as an indication of the flying height of the head 18. The apparatus 70 counts the number of detected peaks and uses the count to determine whether the head 18 is at a proper flying height. The apparatus 70 can be implemented in the channel 22, in the controller 26, or in another location in the disk drive 10.

The apparatus 70 includes: a transition detector 72, a counter 74, and a random access memory (RAM) 76. During operation, the head 18 reads a data pattern from the surface of disk 14 and delivers a resulting analog read signal to the transition detector 72. The transition detector 72 is used to detect events in the analog read signal, such as peaks, indicative of magnetic transitions stored on the disk 14. The transition detector 72 creates an output signal indicative of the location of peaks (or other indicia of magnetic transitions on the disk) in the analog read signal. In general, most transition detectors only indicate the detection of a transition if, among other things, the magnitude of the analog read signal exceeds a predetermined threshold value at a particular point in the signal. Therefore, if the magnitude of the analog read signal is reduced due to resolution effects, some transitions in the read signal will not be detected by the transition detector 72. In one embodiment of the present invention, the predetermined threshold value is optimized so that read signals below a specific resolution value do not produce detectable transitions.

The counter 74 receives the output signal of the transition detector 72 and counts the number of detected peaks in the output signal. The counter 74 then delivers the count value for the pattern to the controller 26. At approximately the same time, the RAM 76 outputs at least one calibration value, corresponding to the particular data storage location on the disk 14 that is currently being accessed, to the controller 26. The controller 26 processes the count value and the calibration value to determine whether the head 18 is within the desired flying height range. In at least one embodiment, the controller 26 uses the input values to generate an actual flying height value for the head 18. If the head 18 is not within the desired flying height range, the controller 26 can postpone or cancel the current read/write operation using read/write enable line 78.

The data pattern which is stored on the surface of the disk 14 in conjunction with the embodiment of FIG. 8 may take any of a number of different forms. In one approach, for example, the pattern is a constant frequency pattern having an elevated frequency, such as those discussed earlier with respect to servo bursts C, D, and E. In another approach, a random pattern is used that results in a peak count that is directly proportional to the flying height. In general, the random pattern is determined by empirical methods and is longer than the constant frequency pattern discussed above.

Figure 9:
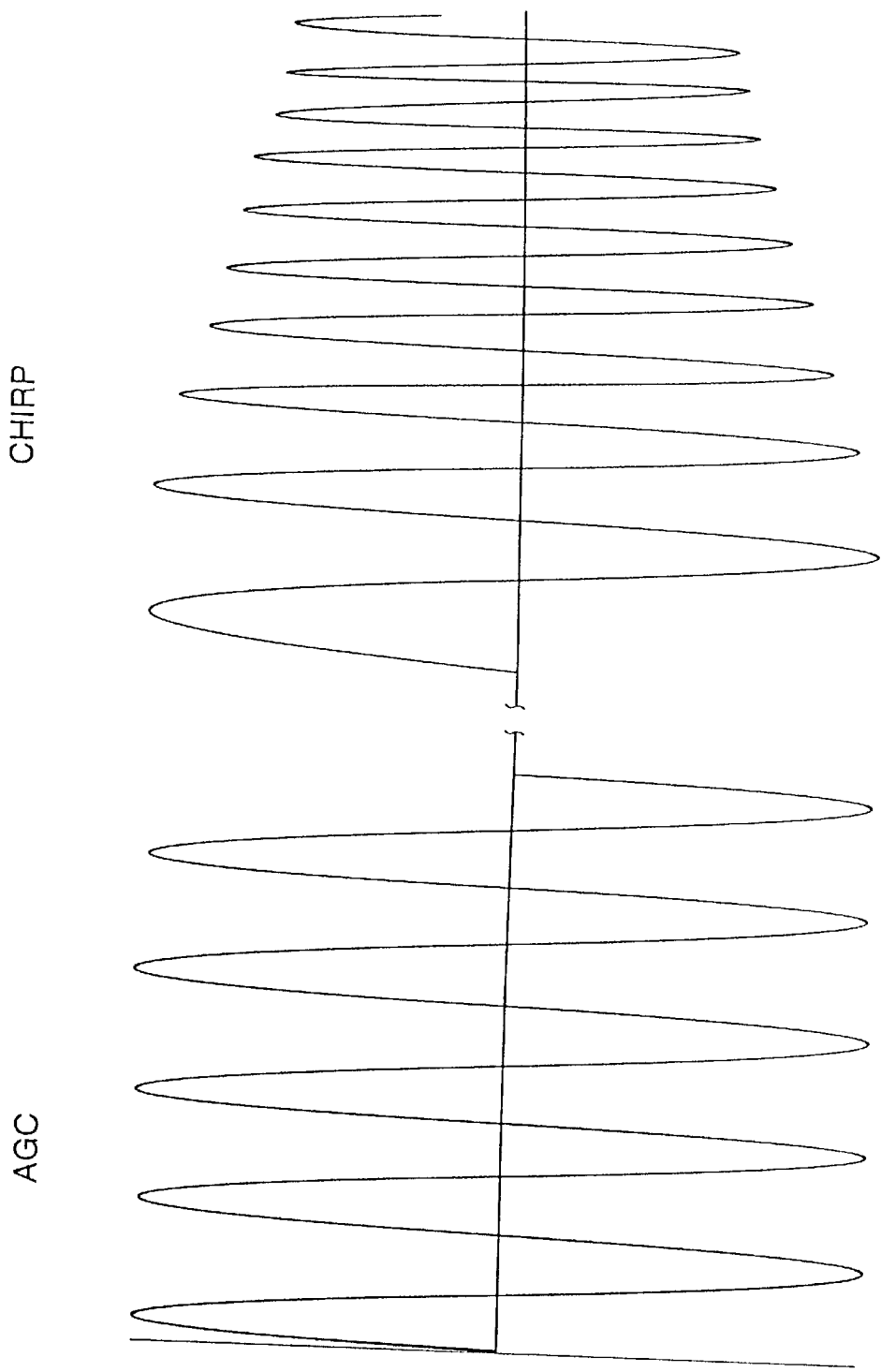
FIG. 9 is a waveform illustrating portions of an analog read signal in accordance with another embodiment of the present invention.

In yet another approach, a data pattern having a linearly increasing frequency (i.e., a chirp pattern) is used. FIG. 9 illustrates an analog read signal resulting from the reading of such a chirp pattern. As seen in the figure, the magnitude of the analog read signal decreases as the frequency of the signal increases. This is due to the resolution effect. The magnitude will eventually decrease to a point where peaks can no longer be detected by transition detector 72. The controller 26 determines the point in the pattern (and, therefore, the cutoff frequency) at which peaks in the analog read signal cease to be detected. The controller 26 then determines whether the present flying height of the head 18 is proper based upon the detected cutoff frequency. Alternatively, the controller 26 can determine whether the present flying height is proper based on a peak count as described above. The length of the chirp pattern in any particular implementation will depend on the range of expected flying heights as well as the ability to correct for head radius using read channel detection level adjustments. In this regard, the length of the chirp pattern generally falls somewhere between the constant frequency pattern and the random pattern. It should be appreciated that other variable frequency data patterns may also be used in accordance with the present invention.

The calibration values stored in the RAM 76 can include, for example: (i) count threshold values representing the minimum number of detected peaks that will result in an acceptable performance of the disk drive 10, (ii) cutoff frequency threshold values representing minimum peak detection frequencies that will result in an acceptable performance of the disk drive 10, and/or (iii) flying height threshold values representing maximum flying heights that will result in an acceptable performance of the disk drive 10. To determine whether the head is in the desired flying height range, the controller 26 can compare, for example, the count value from the counter 74 to the appropriate count threshold from the RAM 76. Alternatively, if a chirp pattern is being used, the controller 26 can compare the detected cutoff frequency to the appropriate cutoff frequency threshold value in the RAM 76. In addition, or alternatively, the RAM 76 (or another memory) can include look-up tables for finding an actual flying height value corresponding to a measured count value or cutoff frequency value. The actual flying height value can then be compared to an appropriate flying height threshold value stored in the RAM 76 for the particular area of the disk 14 being accessed. As an alternative to the look-up table approach, the RAM 76 can include parameters from which an appropriate flying height equation (as a function of measured count value or cutoff frequency value) can be synthesized for each area of the disk surface.

As described above, the transition detector 72 is used to detect events in the analog read signal, such as peaks, indicative of magnetic transitions stored on the disk 14. In this regard, the transition detector 72 may include virtually any type of transition detection device commonly used in digital data storage systems such as, for example, analog peak detector circuitry, partial response/maximum likelihood (PRML) circuitry, decision feedback equalizer (DFE) circuitry, and finite delay tree search (FDTS) circuitry. The transition detector 72 can be the same detector used in the channel 22 to create the digital output signal which is transferred to the host 12 or it can be a dedicated unit which is specifically implemented to perform the flying height determination function. The counter 74 may include any type of digital counting unit that can be controlled by the controller 26 or other controlling means. In one embodiment of the invention, the counter 74 and the RAM 76 are implemented within the controller 26.

In general, the channel 22 in a disk drive system will have a number of variable parameter inputs which affect the performance of the channel 22. The values applied to these variable parameter inputs will affect, for example, the ability of the system to detect flying height variations. In one embodiment of the present invention, the values applied to the variable parameter inputs of channel 22 are changed whenever a flying height determination is being performed. That is, channel parameter values are applied to the channel 22 which optimize the channel for the performance of the flying height determination and are then changed back to normal channel parameter values, optimized for performing read operations, after the flying height determination has been made. For example, it may be determined empirically that the optimal transition detector threshold value for flying height determination is somewhat greater than the threshold value which is optimal for general transition detection. While the head 18 is reading the relevant pattern on the disk 14 during the flying height determination, the controller 26 can cause the threshold value of the transition detector to be changed to the optimal flying height value. In one embodiment, a random access memory is provided for storing optimal flying height channel configuration values for all areas of the disk surface.

Although the present invention has been described in conjunction with its preferred embodiments, it is to be understood that modifications and variations may be resorted to without departing from the spirit and scope of the invention as those skilled in the art readily understand. For example, the patterns used to determine or sense read signal resolution do not have to be located within the servo portion of the disk surface but, alternatively, can be located in a data region on the disk. This can be useful, for example, in a system using dedicated servo techniques. In addition, the AGC field 40 can be modified to include both the high and the low frequency patterns used to determine the read signal resolution. For example, an alternating pattern of high and low frequencies can be implemented in the AGC field 40 so that the channel can set its gain using the low frequency portion and measure read signal resolution using the high frequency portion. Such modifications and variations are considered to be within the purview and scope of the invention and the appended claims.

What is claimed is:

1. A disk drive, comprising:
    a disk having a plurality of concentric tracks for storing data, the tracks including a track having a first data pattern with a first frequency, a second data pattern with a second frequency that is higher than the first frequency, an AGC field and a burst field, wherein one of the first and second data patterns is located in one of the AGC and burst fields, and the first and second data patterns are located in separate non-overlapping circumferential portions of the track;
    a head for reading data from and writing data to the disk; and
    a detection circuit that determines whether the head is within an acceptable flying height range in response to the first and second data patterns.

2. The disk drive of claim 1, wherein the first data pattern is located in the AGC field.

3. The disk drive of claim 2, wherein the second data pattern is located in the AGC field.

4. The disk drive of claim 1, wherein the second data pattern is located in the burst field, and the burst field is used primarily during seek and settling operations.

5. The disk drive of claim 1, wherein the second data pattern is located in the burst field, and the burst field is exclusively used to determine whether the head is within an acceptable flying height range.

6. The disk drive of claim 5, wherein the burst field is continuous and extends across all tracks on a surface of the disk.

7. The disk drive of claim 1, wherein the first data pattern is located in the AGC field and the second data pattern is located in the burst field.

8. The disk drive of claim 7, wherein the burst field is one of a C burst field and a D burst field.

9. The disk drive of claim 8, wherein the track includes an A burst field and a B burst field between the first and second data patterns.

10. The disk drive of claim 9, wherein the A, B, C and D burst fields are located in a single servo region, the A and B burst fields are used primarily during track following operations, and the C and D burst fields are used primarily during seek and settling operations.

11. The disk drive of claim 1, wherein the first and second data patterns are circumferentially adjacent to one another.

12. The disk drive of claim 1, wherein the first and second data patterns are circumferentially spaced from one another.

13. The disk drive of claim 1, wherein the first and second data patterns each intersect a centerline of the track.

14. The disk drive of claim 1, wherein the first data pattern is circumferentially adjacent to a first user data field on the track.

15. The disk drive of claim 14, wherein the second data pattern is circumferentially adjacent to a second user data field on the track.

16. The disk drive of claim 1, wherein the first and second data patterns are circumferentially adjacent to and separated by a region of the track that is devoid of a user data field.

17. The disk drive of claim 16, wherein the region of the track contains two servo burst fields between the first and second data patterns.

18. The disk drive of claim 16, wherein the region of the track contains four servo burst fields between the first and second data patterns.

19. The disk drive of claim 1, wherein only one of the first and second data patterns provides servo positioning information.

20. The disk drive of claim 1, wherein both of the first and second data patterns provide servo positioning information.

21. A disk drive, comprising:
 a disk having a track for storing data, wherein the track includes a first data pattern with a first frequency and a second data pattern with a second frequency that is higher than the first frequency, the first data pattern is located in an AGC field and the second data pattern is located in a burst field;
 a head for reading data from and writing data to the disk; and
 a detection circuit that determines whether the head is within an acceptable flying height range in response to the first and second data patterns.

22. The disk drive of claim 21, wherein the burst field is used primarily during seek and settling operations.

23. The disk drive of claim 21, wherein the burst field is exclusively used to determine whether the head is within an acceptable flying height range.

24. The disk drive of claim 21, wherein the burst field is continuous and extends across all tracks on a surface of the disk.

25. The disk drive of claim 21, wherein the burst field is one of a C burst field and a D burst field.

26. The disk drive of claim 25, wherein the track includes an A burst field and a B burst field between the first and second data patterns.

27. The disk drive of claim 26, wherein the A, B, C and D burst fields are located in a single servo region.

28. The disk drive of claim 21, wherein detection circuit includes a transition detector, a counter, and a memory, an output of the transition detector is coupled to an input of the counter, and outputs of the counter and the memory are coupled to an output of the detection circuit.

29. The disk drive of claim 21, wherein the detection circuit determines whether the head is within an acceptable flying height range independently of flying height data obtained from the disk drive at a predetermined flying height.

30. A disk drive, comprising:
 a disk having a track for storing data, wherein the track includes a first data pattern with a first frequency and a second data pattern with a second frequency that is higher than the first frequency, the first data pattern is located in an AGC field and the second data pattern is located in a burst field;
 a head for reading data from and writing data to the disk; and
 a detection circuit that includes a transition detector, a counter, and a memory, wherein the detection circuit determines whether the head is within an acceptable flying height range in response to the first and second data patterns independently of flying height data obtained from the disk drive at a predetermined flying height, an output of the transition detector is coupled to an input of the counter, and outputs of the counter and the memory are coupled to an output of the detection circuit.

\* \* \* \* \*